April 5, 1949. P. J. BURCHETT 2,466,575
TIGHTENING DEVICE
Filed July 18, 1945
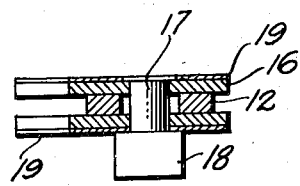
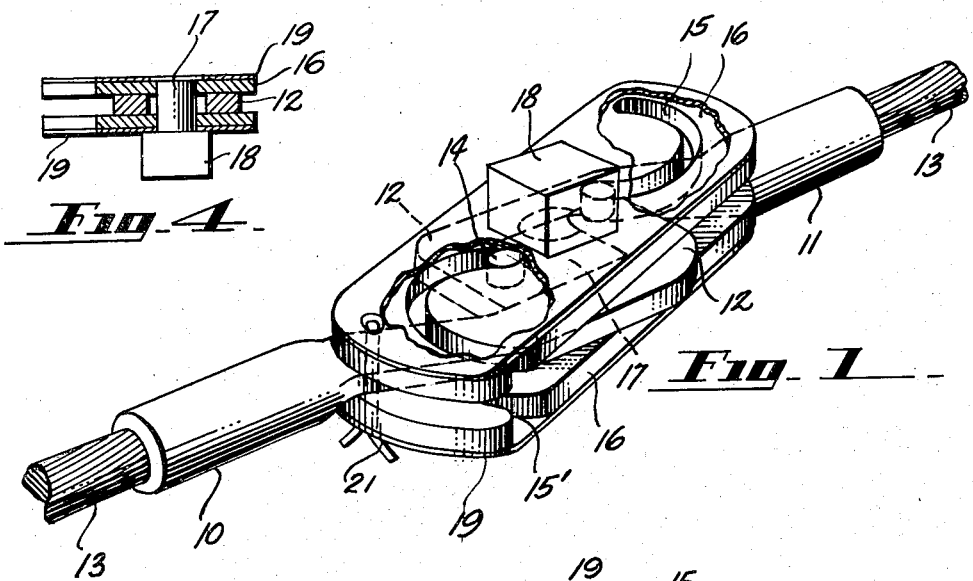
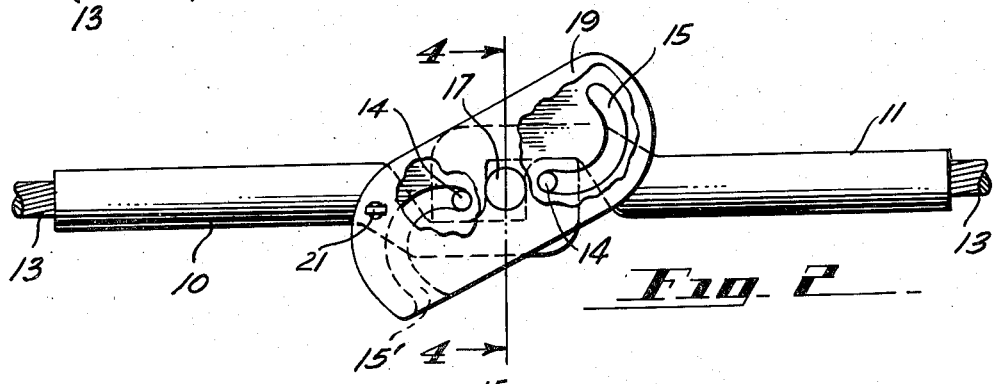
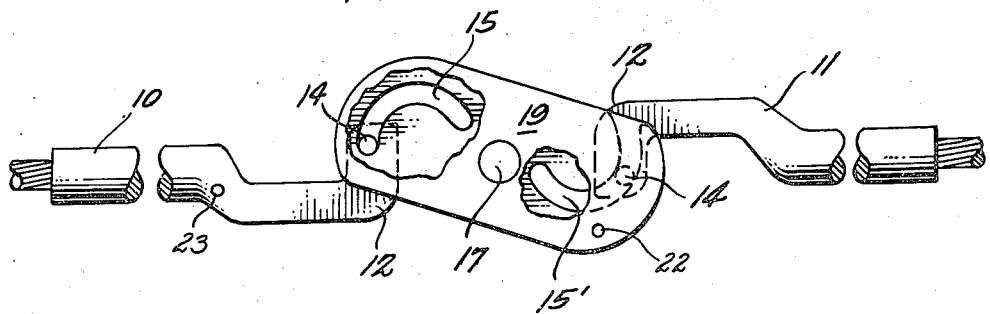
PAUL J. BURCHETT
INVENTOR.
BY George J. Smyth
ATTORNEY Patented Apr. 5, 1949

2,466,575

UNITED STATES PATENT OFFICE 2,466,575

TIGHTENING DEVICE

Paul J. Burchett, Glendale, Calif.

Application July 18, 1945, Serial No. 605,737

11 Claims. (Cl. 24—68)

This invention relates to a tightening and locking device particularly adapted to be used to tighten flexible cables or similar strands and to lock the cables in a taut condition.

The device of the present invention in the illustrated embodiment thereof comprises a pair of arms, each formed with a hook member at the one end thereof. Each arm is to be connected to an end of a cable or the like with the mouths of the hook members oppositely directed. The hook members are each formed adjacent the free ends thereof with oppositely directed pins, the ends of which ride in substantially semi-circular grooves formed in spaced coextensive plates. The plates are held apart by a rigid shaft securely fixed to each plate and are rotatable by and with the shaft.

To facilitate rotation of the shaft the one end thereof is projected beyond the outer surface of the one plate and formed with a plurality of tool-engaging surfaces. The plates can be easily rotated about the axis of the shaft by causing a tool to engage the surface of the projecting end of the shaft and then swinging the tool in the desired direction.

As the opposite ends of the pins carried by the hook members of the arms are engaged in the semi-circular groove of the plates rotation of the latter, due to the camming action between the pins and the walls of the grooves, draws the arms together and at the same time causes them to move in a somewhat circular pattern to dispose the hook members on opposite sides of the shaft.

This movement of the arms draws the adjacent ends of the cable or the like together and when the pins are moved in the grooves until they pass the center line of pull the tension in the cables due to the "past-center" position of the pins tends to rotate the plates still further in the same direction as the plates were turned. This movement of the plates causes the hook members to snugly engage the shaft on opposite sides thereof and the tension in the cables holds the hook members in good engagement with the shaft. Thus, any tendency of the arms to move to a position in which the hook members are not engaged with the shaft will be resisted by the tension in the cables.

It will thus be seen that the shaft takes the loading of the cables after the latter have been tightened and the plates take only the load during the tightening operation. The device of the present invention is particularly adapted to be used in aircraft construction to tighten and lock the control cables in a rigged or taut condition, as the cables are subjected to heavy loads only during flight and the plates are not subjected to any great stress during the tightening operation.

To strengthen the plates, particularly in the cut-away portion forming the grooves, reinforcing members similar in size and shape to the plates are permanently fixed in facewise engagement therewith. The reinforcing members can be fixed to the plates by any means desired as long as the peripheral portions thereof are securely fixed to the peripheral portions of the plates.

Other features and advantages of the present invention will be apparent from the following description taken in connection with the accompanying drawings in which:

Figure 1 is a perspective view of the device of the present invention with parts thereof broken away to more clearly illustrate the same;

Figure 2 is a plan view of the device in the locked position with portions thereof broken away to more clearly illustrate the same;

Figure 3 is a view similar to Figure 2, but showing the device in an unlocked or unlatched position; and Figure 4 is a section taken along line 4—4 of Figure 2.

The device of the present invention, referring now to the drawing, comprises a pair of elongate arms 10 and 11, each formed adjacent the one end thereof with hook members 12. Each arm member at the end opposite to the hook members is formed to receive the ends of cable member 13. Although any conventional means desired can be used to secure the arms 10 and 11 to the cables 13, the arms should be so connected that the mouths of the hook members are oppositely directed.

Each hook member 12 adjacent the free end thereof is provided with oppositely directed pins 14. In the now preferred embodiment of the invention, the pins are formed by inserting a rod through an opening formed adjacent the free end of each hook member and then welding or otherwise securing the rod in place so that the opposite ends thereof extend beyond the opposite sides of the hook members.

The opposite ends of the pins so formed are adapted to engage in substantially semi-circular slots 15 and 15' formed in the opposite end portions respectively of a pair of coextensive plates 16. In the now preferred embodiment of the device of the present invention, only the aligned slots 15' receiving the pins of the hook member carried by arm 10 open onto the edge of the plates. The plates 16 are held spaced apart and on opposite sides of the hook members 12 by a shaft 17 which is securely and permanently mounted in a pair of aligned apertures formed in the two plates 16.

The shaft not only holds the plates 16 apart but also provides a convenient means for rotating the plates about the axis of the shaft. To facilitate rotation of the shaft and plates 16, the one end of the shaft is projected beyond the outer face of the one plate and is formed with a tool-engaging boss 18 here shown as rectangular in shape. The boss provides a plurality of tool engaging surfaces so that the plates can be rotatably moved by engaging a wrench or some similar tool to the boss and turning the wrench in the desired direction.

The slots are so formed that each pair of aligned slots face in opposite directions and extend toward the center of the plates from the opposite ends thereof. Thus, it will be seen that as the plates are turned about the axis of the shaft 17 the camming action between the walls of the grooves 15 and 15' and the pins 14 will draw the arms 10 and 11 together and at the same time move the hook members in a somewhat circular path into positions on opposite sides of the shaft 17. This movement of the arms draws the adjacent ends of the cables together and when the plates have been moved to a position in which the pins have just moved past the center line of pull the tension in the cable, due to the past-center position of the pins, tends to rotate the plates still further in the same direction as the plates were turned. This movement of the plates causes the hook members to be moved into tight engagement with the shaft, each hook engaging opposite sides thereof. It will now be seen that the tension in the cables tends to hold the hooks in engagement with the shaft and any increase in the tension will cause the hooks to more tightly engage the shaft. Thus, the shaft takes the loading of the cables after the latter have been tightened.

It will thus be seen that the shaft must be formed of such a material and of such a size that it can take the compression loads exerted by the hook members after they are moved into engagement with the shaft. As the shaft takes in compression the tension of the cables the plates are relieved from this load and actually serve only as actuators to position the hook members in the locked or latched position. This construction obviates the difficulties had with previous tightening devices where the plates actually took the entire load of the cables.

To strengthen the plates, particularly in the cut-away portion forming the grooves 15 and 15', a reinforcing member 19, similar in size and shape to the plates, is permanently fixed as by welding to the outer face of each plate. The reinforcing members are imperforate and as they are secured to the plates about the peripheral portion as well as on the opposite sides of the grooves 15 they reinforce the plate and prevent any spreading action of the plates in the portions weakened by the removed material forming the grooves.

Although the tension in the cables will tend to hold the hook members in tight engagement with the shaft and prevent movement of the plates out of the latched position of same, means can be provided for positively preventing accidental movement of the plates from their position shown in Figure 2. This means may comprise any conventional safety means and in the illustrated embodiment of the invention comprises a cotter pin 21 which can be inserted through aligned apertures 22 formed in the reinforcing members and the plates when the passages formed by these apertures are aligned with an aperture 23 formed in the arm 10.

It should be understood now that the plates 16 are permanently joined to the arm 10 through the pins of that arm and the closed grooves in which the pins ride. The other arm 11 is detachably connected to the plates as the pins of this arm can be drawn out of engagement with their grooves which open at the sides of the plates. Thus, the cables joined by the device can be disconnected if desired or necessary to the repair of the same or the elements with which they are used.

It will now be seen that the device of the present invention provides a device for tightening and locking adjacent ends of the cables together in which the loads of the cable are taken by a member which can be easily designed to take the loads imposed. The device is easy to operate and does not materially increase the weight of the control cables, an important feature in aircraft construction wherein weight is a most important factor.

Although the now preferred embodiment of the invention has been shown and described herein, it is to be understood that the invention is not to be limited thereto for it is susceptible to changes in form and detail within the scope of the appended claims.

I claim:

1. A tightening and locking device of the type described comprising a pair of oppositely directed hook members, each hook member adapted to be connected to an end of a flexible strand; means pivotally interconnecting the free ends of said hook members; and compression resisting means carried by said interconnecting means, said interconnecting means adapted upon rotation to draw said hook members into engagement with opposite sides of said compression resisting means.

2. A tightening and locking device of the type described comprising a pair of oppositely directed hook members, each hook member adapted to be connected to an end of a flexible strand; a plate having a substantially semi-circular slot adjacent each end thereof; projecting means carried by each hook member, each means engaging in a slot of said plate; means for normally holding said means in said slots; and a shaft projecting from said plate, the slots being so formed in said plate that rotation of said plate about the axis of said shaft causes said hook members to be drawn together in arcuate paths and into locking engagement with said shaft on opposite sides thereof.

3. A tightening and locking device of the type described comprising a pair of oppositely directed hook members, each hook member adapted to be connected to an end of a flexible strand; rigid means pivotally interconnecting the free ends of said hook members; compression resisting means carried by said interconnecting means, said interconnecting means adapted upon rotation to draw said hook members into engagement with opposite sides of said compression resisting means upon rotation of the same; and means for rotating said interconnecting means.

4. A tightening and locking device of the type described comprising a pair of oppositely directed hook members; each hook member adapted to be connected to an end of a flexible strand; a plate having a substantially semi-circular slot adjacent each end thereof; projecting means carried by each hook members, each means engaging in a slot of said plate; means for normally holding said means in said slots; a shaft fixed to and projecting from said plate, the slots being so formed in said plate that rotation of said plate about the axis of said shaft causes said hook members to be drawn together in arcuate paths and into locking engagement with said shaft on opposite sides thereof; and means for rotating said shaft.

5. A tightening and locking device of the type described comprising a pair of oppositely directed hook members; each hook member adapted to be connected to an end of a flexible strand; means pivotally interconnecting the free ends of said hook members; and compression resisting means carried by said interconnecting means, said interconnecting means including means carried by said hook members and cooperative with means on said interconnecting means when the latter are rotated to cause said hook members to be arcuately moved into engagement with opposite sides of said compression resisting means.

6. A tightening and locking device of the type described comprising a pair of oppositely directed hook members; each hook member adapted to be connected to an end of a flexible strand; a plate having a substantially semi-circular slot adjacent each end thereof arranged on opposite sides of said hook members; means projecting from opposite sides of each hook member, each means engaging in a slot of said plates; and a shaft connected to and holding said plates spaced apart, the slots being so formed in said plate that rotation of said plates about the axis of said shaft causes said hook members to be drawn together in arcuate paths and into locking engagement with said shaft on opposite sides thereof.

7. A tightening and locking device of the type described comprising a pair of hook members, each adapted to be connected to an end of a flexible strand; laterally projecting means carried by each member; a plate provided with a pair of substantially semi-circular slots; rigid means centrally carried by said plate and extending outwardly therefrom; and means for holding said hook members in engagement with said plate, with each laterally projecting means disposed in a slot of said plate whereby rotation of said plate causes said hook members to be swung into locking engagement with opposite sides of said rigid means.

8. A tightening device for flexible strands comprising a pair of plates, each plate being provided with two substantially semi-circular slots; a shaft centrally fixed to each plate and holding said plates apart with the slots thereof in alignment; a pair of elongate arms; a hook formed at an end of each arm, said hooks being oppositely directed and disposed between said plates; means carried by each hook and engaged in said slots, said slots being positioned to face in opposite directions whereby said plates may be rotated in one direction to move said arms in arcuate paths to bring said hooks into locking engagement with opposite sides of said shaft.

9. A tightening and locking device for flexible strands comprising a pair of hook members facing in opposite directions, each adapted to be connected to the adjacent ends of a pair of flexible strands; a pair of aligned, coextensive plates; a shaft extending between said plates and permanently secured at opposite end portions thereof to medial portions of said plates; pins projecting laterally from opposite sides of each hook member, each pin adapted to be received within grooves formed in said plates, said grooves being arcuately formed and facing in opposite directions so that rotation of said plates in one direction causes said hook members to be drawn together in arcuate paths and into locking engagement with said shaft, and rotation of said plates in the opposite direction causes said hook members to be moved apart.

10. A tightening device of the type described comprising a pair of oppositely directed hook members each adapted to be connected to adjacent ends of a pair of flexible strands; a pair of plates, each plate being formed with a pair of semi-circular slots, one slot of each plate opening onto the edge face of the plate; a shaft centrally fixed to each plate and holding said plates spaced apart for reception of the hook members therebetween, one slot of each plate being aligned with a slot of the other plate; means extending outwardly from opposite sides of each hook member slidably engaged in aligned slots of said plates, said slots being formed so that one pair of aligned slots face in a direction opposite to the direction faced by the other pair of aligned slots whereby said plates may be rotated in one direction to move said hook members in arcuate paths into locking engagement with opposite sides of said shaft.

11. A tightening and locking device of the type described comprising a pair of hook members, each adapted to be connected to an end of a flexible strand; pin means carried by and oppositely projecting from each member; a pair of plates, each plate being provided with a pair of substantially semi-circular slots adjacent the opposite ends thereof; rigid compression-resisting means centrally carried by said plates and holding the same spaced apart for reception of the hook members therebetween adjacent slots of said plates receiving and guiding the pin means of said members; and means for rotating said rigid means and the plates separated thereby, said slots facing in opposite directions whereby rotation of said plates causes the hook members to be swung into engagement with opposite sides of said rigid means.

PAUL J. BURCHETT.

REFERENCES CITED

The following references are of record in the file of this patent:

UNITED STATES PATENTS

| Number | Name | Date |
|---|---|---|
| 240,314 | Fitzgerald | Apr. 19, 1881 |
| 2,236,649 | Proctor | Apr. 1, 1941 |
| 2,304,318 | Sava | Dec. 8, 1942 |

FOREIGN PATENTS

| Number | Country | Date |
|---|---|---|
| 123,532 | Great Britain | May 29, 1919 |